United States Patent [19]

Hunt

[11] 4,078,723
[45] Mar. 14, 1978

[54] REMOVAL OF GAS FROM GAS/LIQUID MIXTURES

[75] Inventor: George Robert Hunt, High Ongar, England

[73] Assignee: Myson Heat Exchangers Limited, Essex, England

[21] Appl. No.: 695,451

[22] Filed: Jun. 14, 1976

[51] Int. Cl.² .......................... F24D 3/02; B01D 19/00
[52] U.S. Cl. ........................................ 237/63; 55/192; 55/199; 55/465
[58] Field of Search ............... 55/39, 41, 52, 191–203, 55/462, 465; 237/59–63

[56] References Cited

U.S. PATENT DOCUMENTS

| 1,931,419 | 10/1933 | Thrush | 237/63 |
| 2,952,410 | 9/1960 | MacKay | 237/59 X |
| 3,074,645 | 1/1963 | Main | 55/192 X |
| 3,341,122 | 9/1967 | Whittell, Jr. | 237/63 X |
| 3,976,452 | 8/1976 | Meier et al. | 55/192 |

Primary Examiner—Frank A. Spear, Jr.
Assistant Examiner—Richard W. Burks
Attorney, Agent, or Firm—Kenyon & Kenyon, Reilly, Carr & Chapin

[57] ABSTRACT

A method of removing a gas from a mixture of the gas and a liquid of greater density than the gas comprising introducing the mixture continuously into a hollow body in the form of a jet of the mixture, impinging the jet of the mixture onto a surface within the chamber, the jet of mixture and the surface being so arranged as to cause the mixture to spread over the surface and to cause the gas to separate from the spreading mixture and rise to a vent at the uppermost part of the hollow body, the liquid then being removed from the hollow body.

8 Claims, 5 Drawing Figures

REMOVAL OF GAS FROM GAS/LIQUID MIXTURES

The invention relates to the removal of a gas from a mixture of the gas and a liquid.

According to a first aspect of the invention there is provided a method of removing a gas from a mixture of the gas and a liquid of greater density than the gas comprising introducing the mixture continuously into a hollow body in the form of a jet of the mixture, impinging the jet of the mixture onto a surface within the chamber, the jet of the mixture and the surface being so arranged as to cause the mixture to spread over the surface and to cause the air to separate from the spreading mixture and rise to a vent at the uppermost part of the hollow body, the water then being removed from the hollow body.

According to a second aspect of the invention there is provided in a heating system comprising a liquid heater and heat emitting means with an outward connection therebetween for carrying heated liquid from the liquid heater to the heat emitting means and a return connection therebetween for carrying cooled liquid from the heat emitting means to the water heater, a method of removing air from the water according to the first aspect of the invention.

According to a third aspect of the invention, there is provided a heating system comprising a liquid heater and heat emitting means with an outward connection therebetween for carrying heated liquid from the liquid heater to the heat emitting means and a return connection therebetween for carrying cooled liquid from the heat emitting means to the liquid heater wherein a device for removing air from the liquid is connected in one of said connections, the device comprising a hollow body, an inlet to the hollow body, an outlet from the hollow body, a surface within the hollow body, and a vent at the uppermost part of the hollow body, the inlet and the surface being so arranged that, in use, an air and liquid mixture from said one of said connections introduced into the hollow body through the inlet in the form of a jet impinges on the surface to cause the mixture to spread over the surface and to cause the air to separate from the spreading mixture and rise to the vent, the liquid then leaving the hollow body through the outlet to pass to the said one of said connections.

According to a fourth aspect of the invention, there is provided a device for removing a gas from a mixture of the gas and a liquid of greater density than the gas comprising a hollow body, an inlet to the hollow body, an outlet from the hollow body, a surface within the hollow body and a vent at the part of the hollow body which, in use, is uppermost, the surface and the inlet being so arranged that, in use, a gas and liquid mixture introduced into the hollow body through the inlet in the form of a jet impinges on the surface to cause the mixture to spread over the surface and to cause the gas to separate from the spreading mixture and rise to the vent, the liquid leaving the hollow body through the outlet.

The following is a more detailed description of a previously proposed heating system and of an embodiment of the invention, by way of example, reference being made to the accompanying drawings in which.

Figure 1:
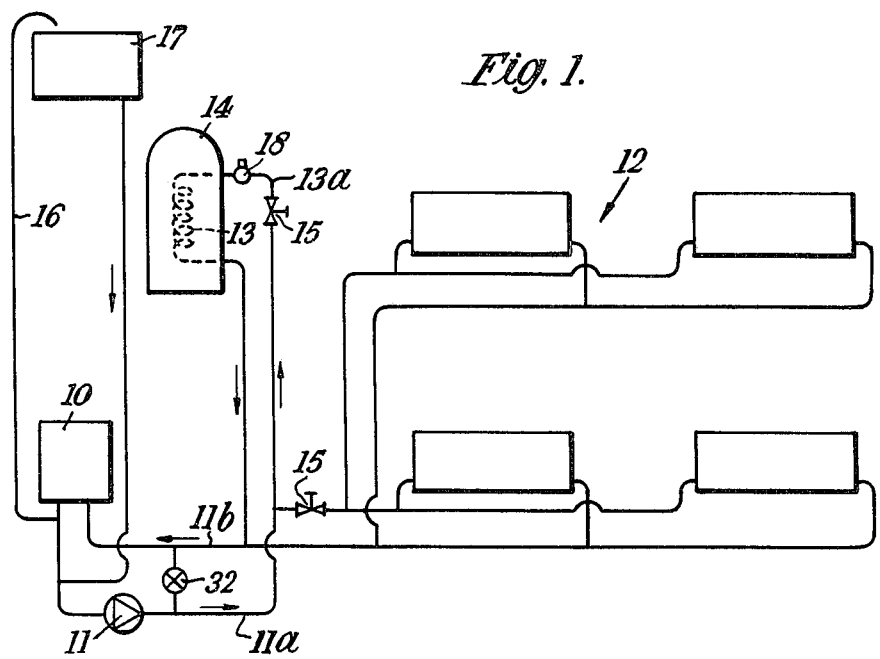
FIG. 1 shows a schematic view of a previously proposed heating system.

Referring first to FIG. 1, the previously proposed heating system comprises a water heater 10 from which heated water is fed by a pump 11 through an outward connecting pipe 11a to heat emitting means in the form of a radiator circuit 12 and a heat exchanger 13 in a tank 14 containing water to be heated and drawn off through a tap (not shown), the water then returning to the heater 10 through a return connecting pipe 11b. The flow of water is controlled by motorised valves 15. An open vent pipe 16 is connected to the outward pipe 11a no more than 6 inches from a heater outlet and a feed and expansion cistern 17 is also connected to the outward pipe 11a with the connections of the vent pipe 16 and the feed and expansion cistern being spaced apart along the outward pipe by no more than 6 inches. An air vent valve 18 which is operated either manually or automatically is provided at the high point of a pipe 13a leading to the heat exchanger 13. A by-pass valve 32 is provided between the outward pipe 11a and the inward pipe 11b.

Such a heating system can have a number of problems if the vent pipe 16 is badly sited. Water can then pump over into the feed and expansion cistern 17 or air can be sucked into the system down the vent pipe 16. Where a section of a pipe under negative pressure is lengthy and includes numerous pipe joints, air can be introduced into the heating system through any of the pipe joints which are badly made due to these sub-atmospheric pressures in the system. The vent pipe 16 and the air vent valve 18 cannot cope with such a situation in extreme cases and hence air collects in massive quantities in the radiators and pipework culminating in the cessation of water flow.

Even with careful siting of the vent pipe 16 and the air vent valve 18 in the system, the initial presence of air can cause fluctuations in the flow of water around the system for half an hour after the system has commenced operation.

These problems can have particularly serious consequences if the heating system is a low water content system and the water heater 10 has a lightweight finned heat exchanger with high heat transfer rates. In this case, the build-up of air in the heating system can cause localised boiling of the heat exchanger which produces an undesirable noise known as "kettling". The build-up of air can be so great as to cause burn out of the heat exchanger even if control thermostats are provided since such thermostats are insulated by the air and thus prevented from operating.

Figure 2:
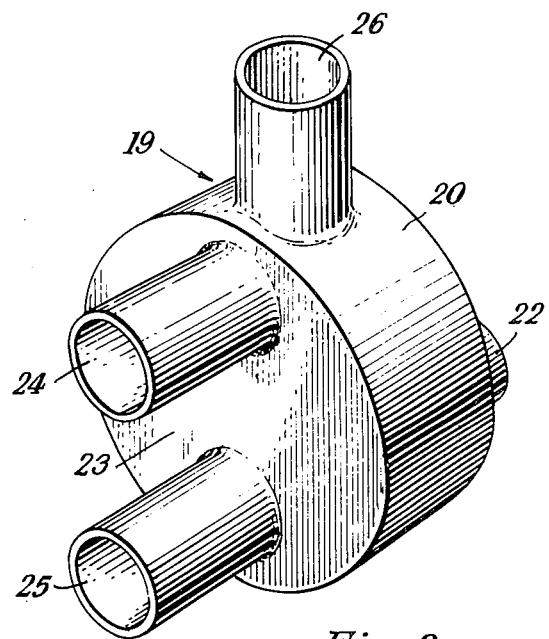
FIG. 2 shows a perspective view of a device for removing air from a mixture of air and water and for use in a heating system according to the third aspect of the invention.
Figure 3:
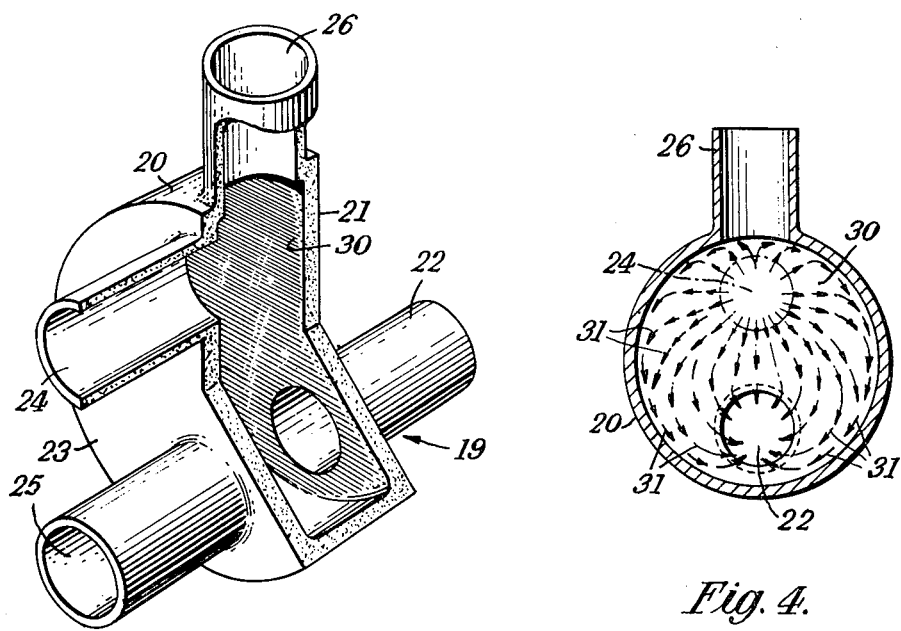
FIG. 3 shows a similar view of the device to the view of FIG. 2, the device being partially broken-away.

Referring next to FIGS. 2 and 3, the device 19 shown therein is designed to operate to prevent the build-up of air and protect the boiler and system from the effects of air build-up. The device 19 comprises a hollow body having a cylindrical wall 20 at one end closed by a planar circular plate 21 (FIG. 4) having a cold inlet feed 22 and at the other end by another planar circular plate 23 having a flow inlet 24 and a return outlet 25. The flow inlet 24 and the return outlet 25 are parallel to one another and parallel to the axis of the cylindrical wall 20. A vent 26 is provided at the uppermost part of the cylindrical wall 27 of the chamber 20.

Figure 5:
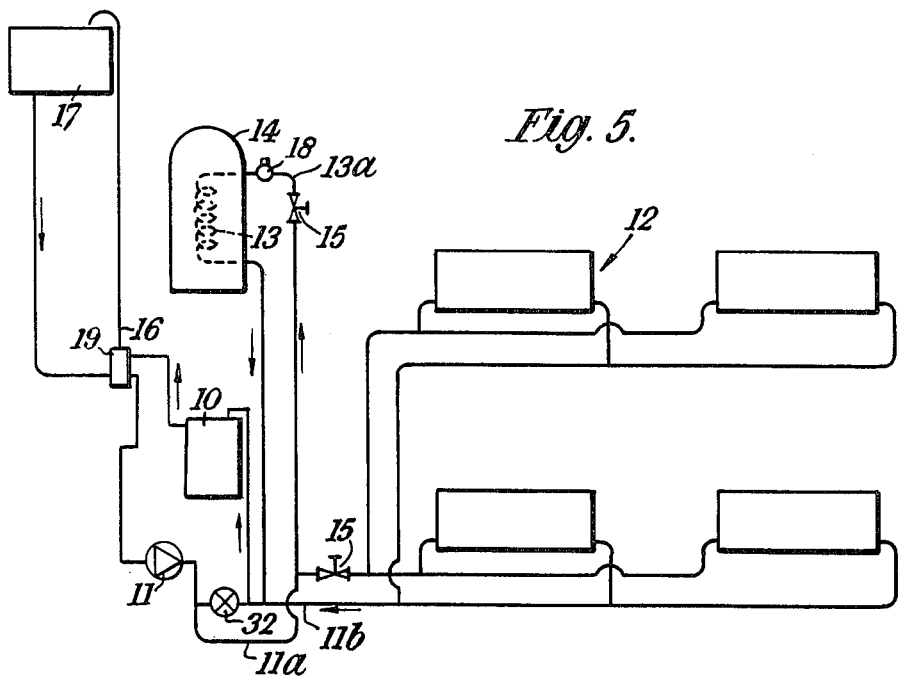
FIG. 5 shows heating system according to the third aspect of the invention including the device of FIGS. 2 to 4.

The device 19 described above with reference to the drawings is connected in a heating system according to the invention as shown in FIG. 5. Parts common to FIGS. 1 and 5 have the same reference numerals and will not be described in detail. In the heating system of FIG. 5, the inward and outward pipes 11a, 11b respectively enter and leave the water heater 10 through the top of the water heater. The device 19 is above the level of the water heater 10 with the inlet 24 and the outlet 25 of the device 19 connected in the outward pipe 11b before the pump 11. The axis of the cylindrical chamber 20 is horizontal with the flow inlet 24 above the return outlet 24 and the vent 26 uppermost.

The vent 26 is connected to the open vent pipe 16 and the cold inlet feed 22 is connected to the feed and expansion cistern 17. The pressure head of water in the cistern 17 is equal or substantially equal to the pressure of water in the outward pipe 11a produced by the pump 11 thereby fixing the neutral point, eliminating any pump-over or suck down problems and also ensuring that the low pressure effect of the pump 11 is limited to the pipe run and to the connections between the pump 11 and the device 19. It also ensures that air is removed before it reaches the pump 11 and valves 15 to modify adversely their designed performance with a consequent adverse modification of the designed heating performance of the whole system.

The operation of the heating system is described with reference to FIGS. 2 to 5. Parts common to FIGS. 2 and 3 and to FIGS. 5 are given the same reference numerals and will not be described in detail.

The pump 11 drives heated water through the outward pipe 11a to the radiator circuit 12 and the heat exchanger 13. The radiator circuit 12 emits heat to warm an enclosed space such as a room and the heat exchanger 13 warms water in the tank 14. The cooled water together with entrained air then passes through the return pipe 11b and is re-heated by the water heater 10 before passing to the device 19. The mixture of air and water enters the device 19 through the flow inlet 24 which introduces the mixture in the form of a jet which impinges against an interior vertical planar surface 30 of one end wall 21 of the device 19 (see FIGS. 3 and 4). This vertical planar surface 30 is normal to the direction of the jet and, after impinging thereon, the water spreads out in a thin film across the surface 30 from the point of impact.

Figure 4:
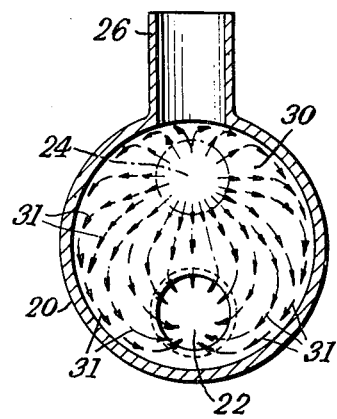
FIG. 4 shows a cross-sectional view of the device of FIGS. 2 and 3.

A given article of water will continue travelling across the surface 30 in the direction shown by one of the lines of the arrows 31 in FIG. 4, until it strikes the cylindrical wall 20. During this travel, air bubbles, being large, light and unstable in relation to the thin film of water will tend to become detached from the flow and rise upwards. The detached air bubbles are diverted through the jet and exhaust through the vent 26.

The given particle of water, after striking the cylindrical wall 20, will follow the curved contour of this wall downwards until reaching a confluence point opposite the return outlet 25. The water is drawn out of the chamber 20 through the return outlet 25 by the pump 11.

This movement of the water towards the return outlet 25 creates vortices in the chamber 20 with a pressure lower than the pressure of the spread water on the surface 30. These lower pressure vortices draw bubbles of air from the surface 30 thus aiding their natural buoyancy.

When the heating system of FIG. 5 is installed and put into commission air is removed from the system within a short period of time, assuming that the radiators and other components are vented in accordance with normal practice. There are no prolonged spasmodic fluctuations in flow rate after the first minute or so of starting the pump 11. This clearly assists the installation and commissioning of the system and protects the water heater 10 from problems caused by air build-up such as kettling and burn out.

It will be appreciated that the jet of air/water mixture may impinge on a surface other than a planar surface normal to the direction of the jet. For example, the surface while substantially vertical may be conical or concave or convex and may be arranged at a small angle to the direction of the jet.

It will also be appreciated that the device may be used other than in a heating system to remove a gas from a mixture of the gas and a liquid of greater density than the gas by a method which comprises introducing the mixture continuously into a hollow body in the form of a jet of the mixture, impinging the jet of the mixture onto a surface within the chamber, the jet of mixture and the surface being so arranged as to cause the mixture to spread over the surface and to cause the gas to separate from the spreading mixture and rise to a vent at the uppermost part of the hollow body, the liquid then being removed from the hollow body.

In addition, the heating system may use a liquid other than water to convey heat from a heater to heat emitting means and in this case the device 19 is used to separate air from the liquid.

In the central heating system of FIG. 1, a failure of water heater controls (not shown) may allow the water heater 10 to boil the water. The steam so produced will leave the boiler through the outward pipe 11a and will leave the system both through the vent pipe 16 and the pipe to the feed and expansion tank 17 so preventing cold water entering the system to replace the water converted to steam. Continued loss of water without replacement will eventually damage the boiler. In the system of FIG. 5, under similar circumstances, the steam will enter the device 19 and be separated from the water in the same manner as air, as described above with reference to FIGS. 2 to 5 of the accompanying drawings. No steam will leave through the cold water feed 22 and so water lost as steam will be replaced enabling the system to maintain a steady state without damage to the water heater 10.

What we claim is:

1. An unpressurized heating system comprising a water heater, heat emitting means, an outward flow pipe conveying heated water from said water heater to said heat emitting means, a return flow pipe conveying water from said heat emitting means to said water heater, and a device for removing gases including air and steam from said system, said device being connected in one of said pipes and comprising a hollow body, an inlet to said hollow body connected to said one of said pipes, a vent at the uppermost part of said hollow body, a substantially vertical, substantially planar surface within said hollow body opposite said inlet upon which water from the inlet impinges in a jet to spread over said surface and cause gases entrained in the water to separate therefrom and leave said hollow body through said vent, an outlet from said hollow body connected to a continuation of said one of said pipes through which water free of gases leaves said hollow body, and a further inlet into said hollow body separate from said vent and connected to a reservoir of cold water for replacing water lost as steam wherein steam leaving said system through said vent is replaced by water from said reservoir.

2. The system according to claim 1, wherein said hollow body, said inlet and said outlet are disposed to cause water to pass through said hollow body in a path in which at least one vortex is created by the water within said hollow body, the vortex being at a lower pressure than the water in the spreading mixture, the gases being drawn from the spreading mixture towards said lower pressure vortex before venting.

3. The system according to claim 1, wherein said inlet is normal to said surface so that in use the direction of the jet is substantially normal to said surface and wherein said surface is substantially vertical.

4. The system according to claim 1, wherein said inlet is arranged above said outlet.

5. The system according to claim 1, wherein said hollow body includes a cylindrical wall which is closed by planar circular plates, said surface being formed by the interior surface of one of said plates, said inlet and said outlet being in the other of said plates and said vent being at the uppermost part of said cylindrical wall.

6. The system according to claim 1, wherein a pump is included in said outward connection and wherein said device is connected in said outward connection between said water heater and said pump.

7. The system according to claim 1, wherein said device is located in said outward flow connection at that point where the pressure head in the reservoir is substantially equal to the pressure of water in said outward connection.

8. A device for removing gases including air and steam from an unpressurized heating system including a water heater, heat emitting means, an outward flow pipe conveying heated water from the water heater to the heat emitting means, a return flow pipe conveying water from the heat emitting means to the water heater and a reservoir for water to replace water lost in the system, said device comprising a hollow body, an inlet to said hollow body for connection to one of said pipes, a vent at the uppermost part of said hollow body, a substantially vertical, substantially planar surface within said hollow body opposite said inlet upon which water from said inlet impinges in a jet to spread over said surface and cause the gases entrained in the water to separate therefrom and leave said hollow body through said vent, an oulet from said hollow body for connection to a continuation of said one of said pipes through which water free of gases leaves said hollow body and a further inlet into said hollow body separate from said vent for connection to the reservoir whereby steam leaving the system through said vent is replaced by water from the reservoir.

* * * * *

UNITED STATES PATENT AND TRADEMARK OFFICE
CERTIFICATE OF CORRECTION

PATENT NO. : 4,078,723

DATED : March 14, 1978

INVENTOR(S) : George Robert Hunt

It is certified that error appears in the above-identified patent and that said Letters Patent are hereby corrected as shown below:

Col. 3, line 15, delete "24" and insert -- 25 --;

Col. 3, line 51, delete "article" and insert -- particle --;

Col. 3, line 58, delete first "through" and insert -- around --.

Signed and Sealed this

Fifteenth Day of August 1978

[SEAL]

Attest:

RUTH C. MASON
Attesting Officer

DONALD W. BANNER
Commissioner of Patents and Trademarks